(No Model.) 4 Sheets—Sheet 1.

G., J. G. & M. O. REHFUSS.
MACHINE FOR MAKING AND ATTACHING LOOPS TO THE EDGES OF FABRICS BY MEANS OF A NEEDLE AND LOOPER.

No. 438,427. Patented Oct. 14, 1890.

Witnesses:
Hamilton D. Turner
Aley. Barkoff

Inventors:
George Rehfuss,
John G. Rehfuss &
Martin O. Rehfuss
by their Attorneys
Howson & Howson (No Model.) 4 Sheets—Sheet 3.

G., J. G. & M. O. REHFUSS.
MACHINE FOR MAKING AND ATTACHING LOOPS TO THE EDGES OF
FABRICS BY MEANS OF A NEEDLE AND LOOPER.

No. 438,427. Patented Oct. 14, 1890.

Witnesses:
Hamilton D. Turner.
Alex. Barkoff

Inventors:
George Rehfuss,
John George Rehfuss &
Martin O. Rehfuss
by their Attorneys
Howson & Howson (No Model.) 4 Sheets—Sheet 4.
G., J. G. & M. O. REHFUSS.
MACHINE FOR MAKING AND ATTACHING LOOPS TO THE EDGES OF
FABRICS BY MEANS OF A NEEDLE AND LOOPER.
No. 438,427. Patented Oct. 14, 1890.
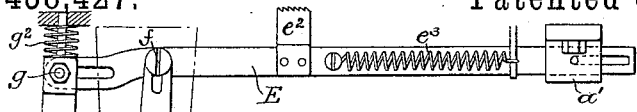
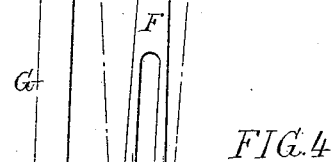
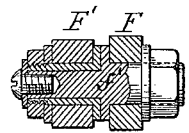
FIG. 4.   FIG. 14.
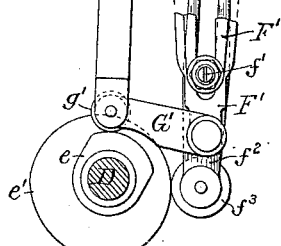
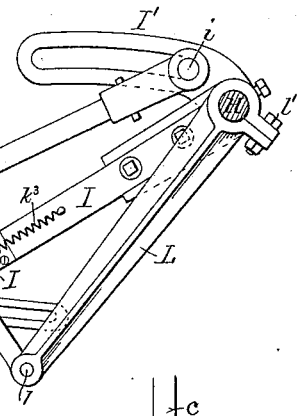
FIG. 5.
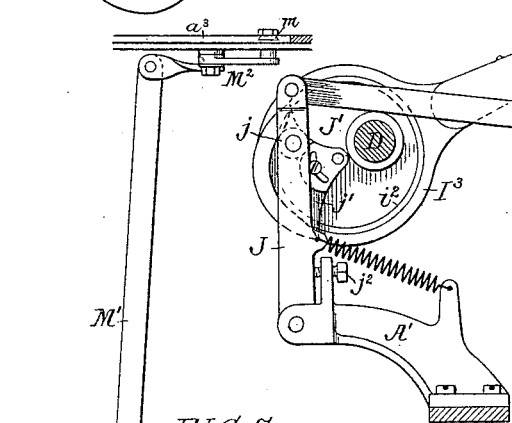
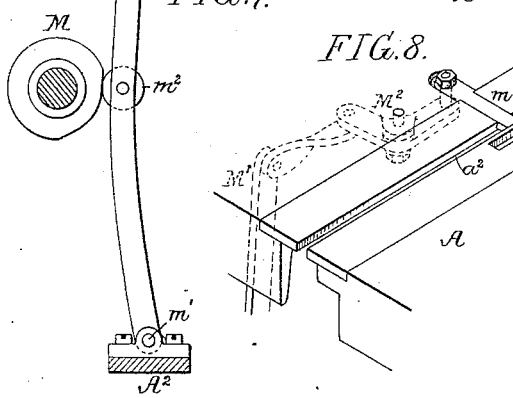
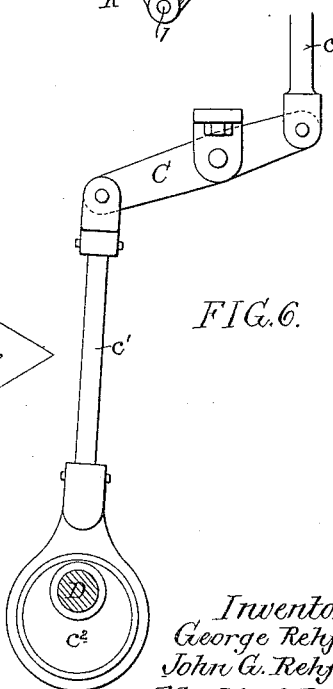
FIG. 7.   FIG. 8.   FIG. 6.
Witnesses:
Hamilton D. Turner.
Alex Barkoff
Inventors:
George Rehfuss,
John G. Rehfuss, &
Martin O. Rehfuss
by their Attorneys
Howson & Howson

UNITED STATES PATENT OFFICE.

GEORGE REHFUSS, JOHN GEORGE REHFUSS, AND MARTIN O. REHFUSS, OF PHILADELPHIA, PENNSYLVANIA.

MACHINE FOR MAKING AND ATTACHING LOOPS TO THE EDGES OF FABRICS BY MEANS OF A NEEDLE AND LOOPER.

SPECIFICATION forming part of Letters Patent No. 438,427, dated October 14, 1890.

Application filed February 13, 1890. Serial No. 340,272. (No model.)

*To all whom it may concern:*

Be it known that we, GEORGE REHFUSS, JOHN GEORGE REHFUSS, and MARTIN O. REHFUSS, citizens of the United States, and residents of Philadelphia, Pennsylvania, have invented certain Improvements in Fringe-Machines, of which the following is a specification.

The object of our invention is to construct a machine for forming a fringe on the edge of fabrics—such as curtains, dress-goods, and headings—the fringe being formed on the fabric and looped simultaneously. In some cases the loops are severed by mechanism fully described hereinafter, reference being had to the accompanying drawings, in which—

Figure 1:
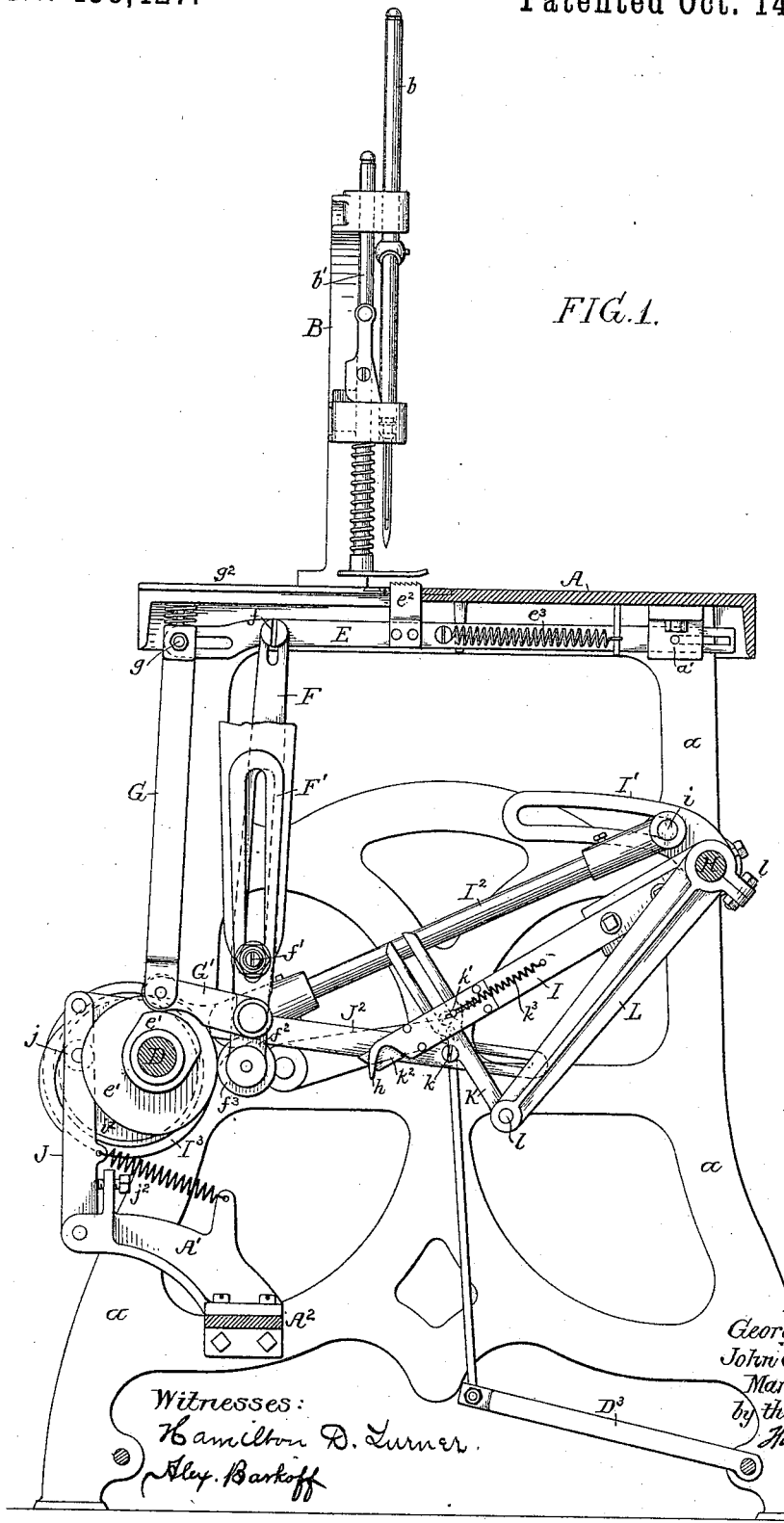
Figure 2:
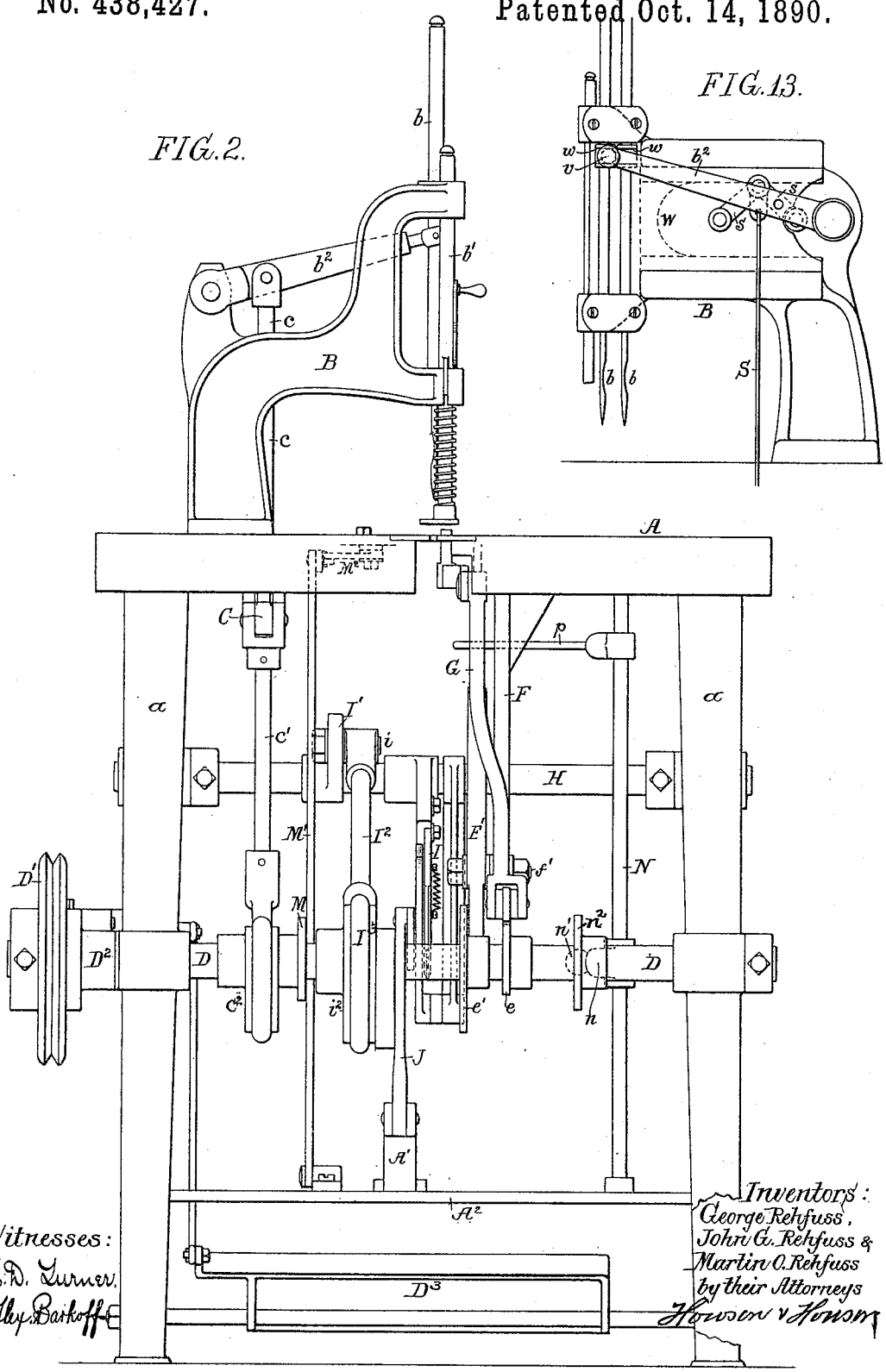
Figure 3:
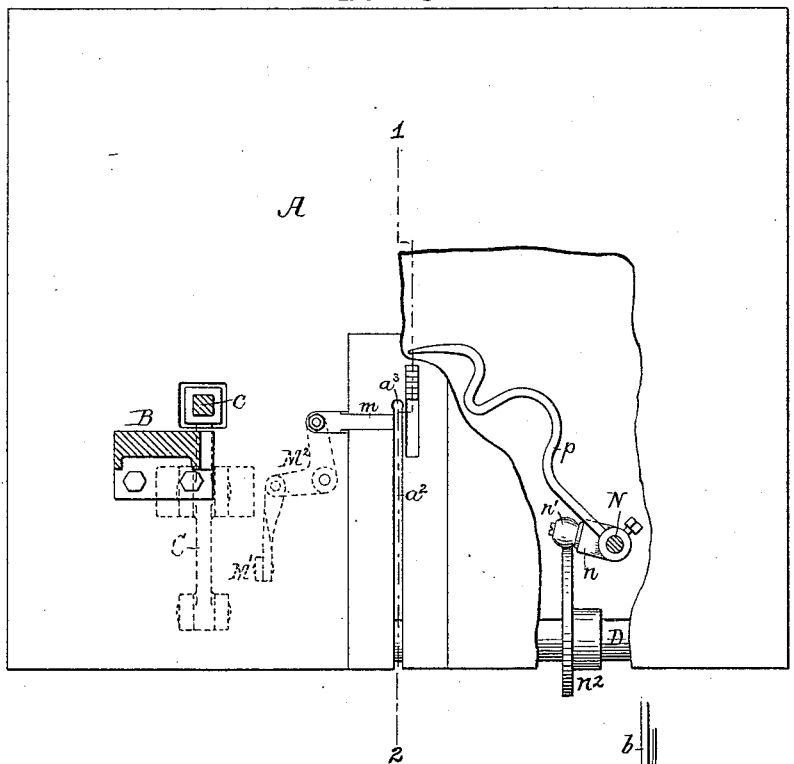
Figure 9:
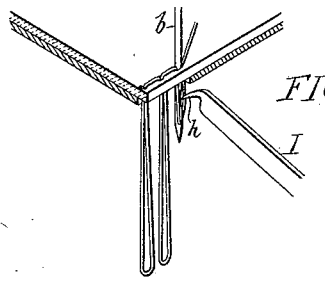
Figure 10:
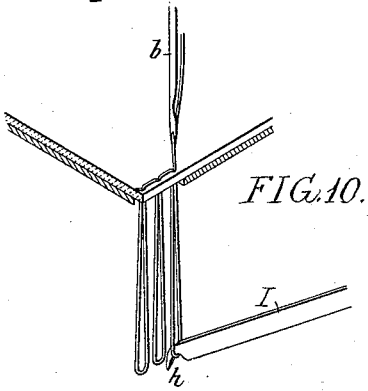
Figure 11:
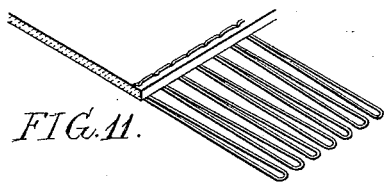
Figure 12:
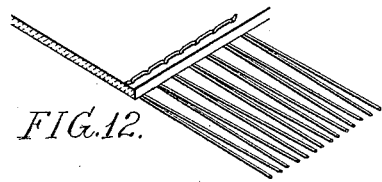

Figure 1 is a sectional elevation of our improved fringe-machine on the line 1 2, Fig. 3. Fig. 2 is a rear view. Fig. 3 is a sectional plan view. Figs. 4, 5, 6, 7, 8, and 14 are detached views illustrating features of our invention. Figs. 9 and 10 are diagrams showing the stitch. Figs. 11 and 12 are perspective views of the fringe, and Fig. 13 is a view of the double-needle head.

A is the table, mounted on suitable legs $a$ $a$, and B is the head, having bearings for the needle-bar $b$ and the presser-bar $b'$, a single needle-bar being shown in Figs. 1 and 2. At the rear of the machine is mounted in suitable bearings a cam-shaft D, driven by a suitable belt-wheel D', which is loose on the shaft, but can at times be clutched thereto by means of the clutch $D^2$, thrown into engagement by the operation of the treadle $D^3$. Any suitable clutching device may be used for making this connection.

The needle-bar $b$ is operated through the medium of the pivoted arm $b^2$, which is connected to a lever C, Fig. 6, pivoted to the under side of the table, one arm of this lever being connected to said lever $b^2$ by a rod $c$, the other arm of the lever being connected to an eccentric-rod $c'$, which spans an eccentric $c^2$ on the shaft D, so that a reciprocating motion is thus imparted to the needle-bar, giving the throw required.

The feed mechanism of the machine is clearly shown in Fig. 4, and on the cam-shaft D are two cams $e$ $e'$, the cam $e$ giving the lifting motion to the feed-bar and the cam $e'$ giving the feeding motion. The feed-plate $e^2$ is attached to the bar E, which slides in a bearing $a'$ on the under side of the table. A spring $e^3$ returns the bar to its normal position. This feed-bar E is secured to a lever F by a pin $f$. The lever F is fulcrumed on a sleeve carried by a pin at $f'$, which is adjustably secured to the slotted hanger F', Fig. 14. The lever is also slotted, so that by moving this pivot-pin up or down the slots the fulcrum of the lever is adjusted and consequently the throw thereof is altered. The lever has an arm $f^2$, provided with a friction-wheel $f^3$, which bears against the periphery of the cam $e'$.

The feed-bar E extends beyond the pivot $f$ and is slotted, as shown in Fig. 4, and through this slot and through the head of a bar G passes a pivot-pin $g$. The bar G is pivoted to a short link G', which in turn is pivoted to the hanger F'.

At the intersection of the bar G and the link G' is a roller $g'$, which rests upon the periphery of the cam $e$. A spring $g^2$ at the upper end of the bar G tends to keep the roller $g'$ in contact at all times with the cam. It will be seen, therefore, that the feed-bar can be given any degree of throw by the change of the fulcrum. The throw of the feed-bar will be changed not from one end alone, but from the middle or the line of the needle equidistant each side thereof.

We will now describe the mechanism for drawing the loop of the fringe.

Hung to a shaft H on the front of the machine is a looper-arm I, having an extension I', slotted, as shown, and adapted to this extension is a pivot-pin $i$, which passes through the head of the rod $I^2$, secured to the strap $I^3$ of the eccentric $i^2$. At the outer end of the arm I is a hook $h$, which catches in the loop formed by the needle as it passes through the fabric to be fringed. In some instances a cutter is provided for this looper, so as to sever the loop, forming loose ends instead of loops on the fringe. The construction of the particular mechanism we prefer to employ will be described hereinafter. By the adjustment of the pivot-pin $i$ in the slot in the extension I' the length of the loop can be regulated.

Pivoted to a bracket A' on the cross-bar A$^2$ is an arm J, having a roller $j$, adapted to a cam-slot $j'$ in a plate J', adjustably secured to the eccentric $i^2$. Pivoted to the upper end of this arm J is a bar J$^2$, slotted at its outer end, and adapted to this slot is a pin $k$, which passes through an orifice in the yoked arm K, pivoted to an adjustable hanger L at $l$. This hanger is secured to the shaft H by a bolt $l'$, and can be adjusted to accord with the adjustment of the looper. Adapted to the forked end of the bar K is a pin $k'$, which is attached to the knife $k^2$, guided in the hook. A spring $k^3$ holds the knife to its normal position. The arm J is adjusted in respect to the cam by a set-screw $j^2$, and is kept in contact with the set-screw by a spring, as shown in Fig. 5. The details of this portion of the device may be varied without departing from our invention.

Just before the descent of the needle the slot $a^2$ at the point adjacent to the needle is closed by a reciprocating plate $m$, so that the fabric is supported on all sides of the needle, and the latter cannot therefore drag the fabric down into the slot, the plate $m$ also serving to clamp the previously-formed loop and prevent the drawing out of the same.

The plate $m$ is operated from a cam M on the cam-shaft, as shown in Fig. 7. An arm M', pivoted at $m'$ to the cross-bar A$^2$, carries a roller $m^2$, which bears against the cam, and is connected to one arm of a bell-crank lever M$^2$, pivoted to the under side of the table, the other arm of this bell-crank lever being connected to the plate $m$. Thus after the feed, and as the needle passes down to make a loop, the plate moves forward, closes the slot, and clamps the preceding loop and holds it so that the needle will not draw from this loop, but from the spool or bobbin.

To move the loops away from the looper and needle as they are formed, a vertical shaft N is pivoted, as shown, and on this vertical shaft is an arm $n$, carrying a ball $n'$, which rests against a cam $n^2$ on the shaft D, and has at its upper end a finger $p$, preferably of the shape shown in Fig. 3, which finger moves past the throat-plate of the machine, carrying the loops as they are formed out of the path of the needle and of the looper.

The operation of the machine is as follows: The fabric to be fringed is placed in position on the table and the presser-foot and feed adjusted, after which power is applied, the needle passing through the fabric, and the looper, as the needle passes downward, catches the loop passing in the space formed by the crook in the needle, and as the needle returns the looper holds the loop, and when the needle clears the cloth the loop is severed if the cutting attachment is applied, and the clamp-plate releases the goods. The feed then takes place and another loop is formed.

In Fig. 13 we have shown a view in which two needles are used having different-colored threads, so that a varied fringe may be used by simply throwing one or other of the needles into position. The needles $b\ b$ are mounted in bearings in the sliding frame W, adapted to the head B, and have pockets $w\ w$, to which is adapted a pin $v$ on the arm $b^2$. Toggle-levers $s\ s$ are pivoted to each other and to the slide and head, and are connected to an operating-head S, which is moved by a suitable treadle, so that by moving this toggle-lever one or other of the needle-bars can be thrown into line with the needle-opening and with the pin $v$ on the operating-arm $b^2$. It will be evident that more than two needle-bars can be mounted on the sliding frame, depending on the variety of color required in the fringe.

We claim as our invention—

1. The combination, in a fringe-machine, of the needle, the loop-forming hook, the table having a slot for the passage of the loops, and a reciprocating plate located adjacent to the needle, whereby the slot may be closed at intervals and the needle thus inclosed on all sides and prevented from dragging the fabric down into the slot, substantially as specified.

2. The combination, in a fringe-sewing machine, of the needle, the vibrating loop-forming arm, and a knife carried by said arm, but movable on the same, so as to sever the thread caught and looped thereby, substantially as specified.

3. The combination, in a fringe-sewing machine, of the needle, the vibrating loop-forming arm, a knife carried by said arm, but movable thereon, and independent mechanism for vibrating the arm and for reciprocating the knife thereon, substantially as specified.

In testimony whereof we have signed our names to this specification in the presence of two subscribing witnesses.

GEORGE REHFUSS.
JOHN GEORGE REHFUSS.
MARTIN O. REHFUSS.

Witnesses:
HENRY HOWSON,
HARRY SMITH.